(12) United States Patent
Gao et al.

(10) Patent No.: US 8,331,804 B2
(45) Date of Patent: Dec. 11, 2012

(54) METHOD AND APPARATUS FOR GENERATING A REFERENCE SIGNAL LEVEL AND FOR CANCELLING AMPLIFIER OFFSET IN AN OPTICAL SYSTEM

(75) Inventors: Miaobin Gao, Saratoga, CA (US); Hui-Chin Wu, Cupertino, CA (US); Christine M. Krause, Boulder Creek, CA (US); Hengju Cheng, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 12/722,839

(22) Filed: Mar. 12, 2010

(65) Prior Publication Data

US 2011/0222860 A1     Sep. 15, 2011

(51) Int. Cl.
*H04B 10/08* (2006.01)
*H04B 10/06* (2006.01)
(52) U.S. Cl. .................. 398/208; 398/33; 398/209
(58) Field of Classification Search .............. 398/22, 398/33, 136, 137, 162, 208, 209
See application file for complete search history.

(56) References Cited

U.S. PATENT DOCUMENTS

| 6,342,959 B1 * | 1/2002 | Haxell et al. ............... 398/79 |
| 2002/0027688 A1 * | 3/2002 | Stephenson ............... 359/152 |
| 2009/0257578 A1 * | 10/2009 | Shih et al. ............... 379/406.1 |
| 2010/0150561 A1 * | 6/2010 | Cho et al. ............... 398/79 |

FOREIGN PATENT DOCUMENTS

EP     1545029 A2 *   6/2005

* cited by examiner

*Primary Examiner* — Dalzid Singh
(74) *Attorney, Agent, or Firm* — Blakely, Sokoloff, Taylor & Zafman LLP (57) ABSTRACT

Described is a method and apparatus for generating a mid-level reference signal and for cancelling amplifier offset in an optical communication system without DC-balancing of optical data. The apparatus comprises an optical-to-electrical converter to receive an optical signal and to generate an electrical signal; an amplifier to receive the electrical signal and to generate an output signal based on a reference signal; a feedback mechanism to be enabled during a training phase only and to generate a control signal from the output signal; and a counter logic having a digital-to-analog converter to generate the reference signal based on the control signal.

16 Claims, 6 Drawing Sheets

METHOD AND APPARATUS FOR GENERATING A REFERENCE SIGNAL LEVEL AND FOR CANCELLING AMPLIFIER OFFSET IN AN OPTICAL SYSTEM

FIELD OF THE INVENTION

Embodiments of the invention relate generally to the field of fiber optical communication systems. More particularly, embodiments of the invention relate to a method and an apparatus for generating a reference signal level in a fiber optical receiver and for cancelling amplifier input offset via open loop fiber optical receiver architecture of the fiber optical system.

BACKGROUND

Fiber optical communication receivers determine content of information on an optical link (such as fiber optical interconnect) by a reference signal. This reference signal is also known as a decision level signal. The reference signal allows an input amplifier or a comparator to determine if the data on the optical link is a logical one or a logical zero. The reference signal is generated by a feedback mechanism in an optical receiver which raises or lowers the reference signal level based on the incoming data on the optical link.

Figure 1A:
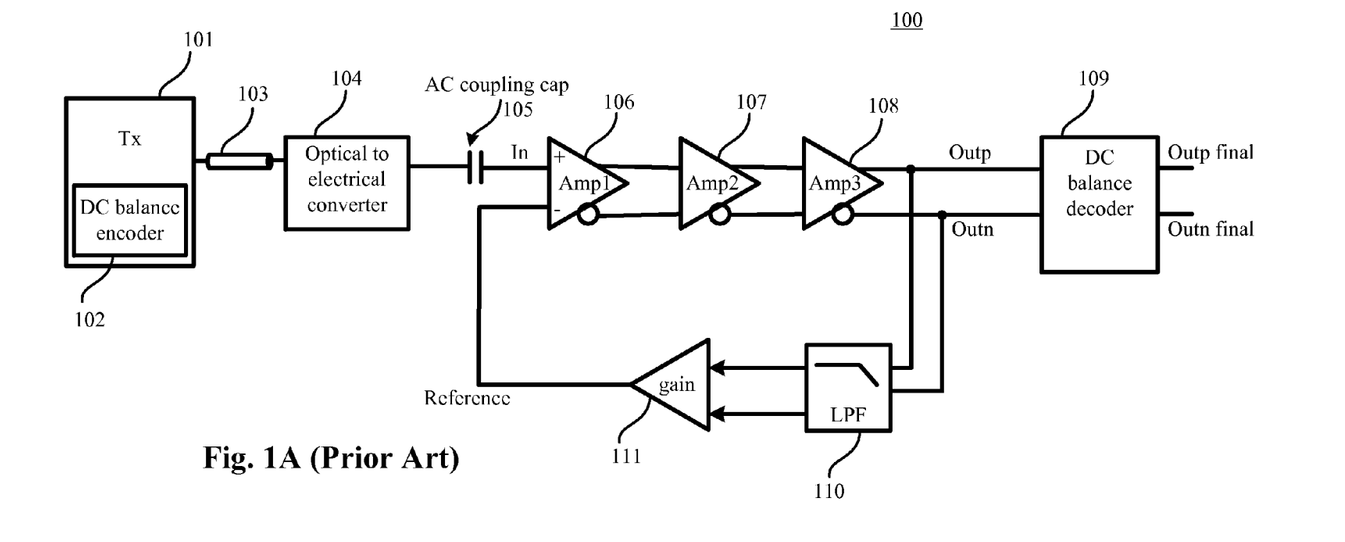
FIG. 1A illustrates a traditional optical system with AC-coupling capacitor, DC-balancing encoder and decoder, and a feedback mechanism to generate a reference signal.

FIG. 1A shows a traditional optical receiver 100 with a closed loop feedback system to generate the reference signal. The receiver includes an amplifier 106 that compares incoming data In with the reference signal level and generates amplified outputs Outp and Outn. Output of the amplifier 106 may be further amplified by amplifiers 107 and 108. The data received by the amplifier 106 comes from an optical link 103 and is converted to an electrical signal by an optical-to-electrical converter 104. This data is DC-balanced by an encoder 102 in a transmitter 101. The DC-balanced data is generated by encoding a specific data pattern on the data received by the amplifier 106 so that the data has nearly equal number of logical ones and logical zeros. The encoding is generally performed by the transmitter 101 transmitting the optical data to the optical link 103. This DC-balanced data is filtered by a feedback mechanism having a low pass filter (LPF) 110 followed by an amplifier (or gain stage) 111. The LPF 110 receives the amplified electrical signal from amplifier 108 and creates a low cutoff frequency (e.g., near DC level) in the overall receiver transfer function. The output of the LPF 110 is amplified by amplifier 111 resulting in the reference signal.

Figure 1B:
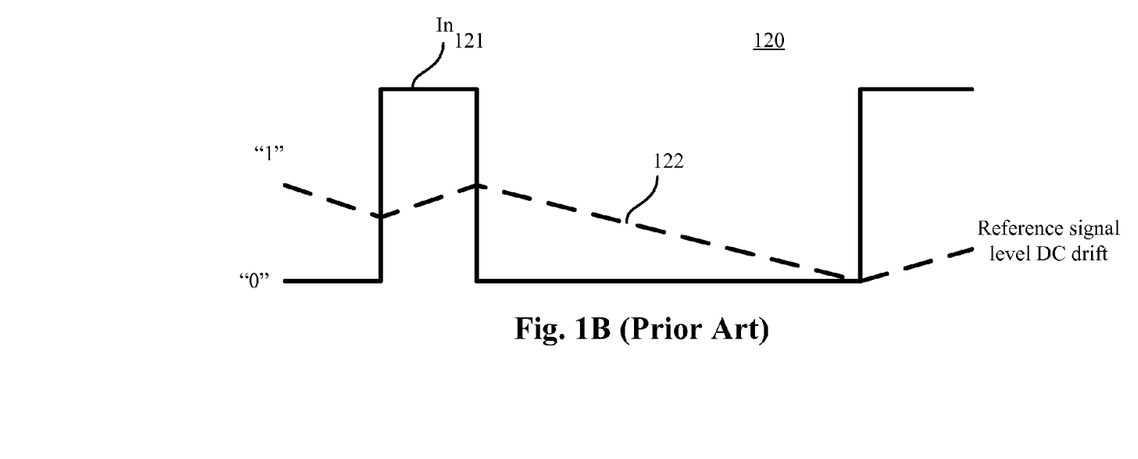
FIG. 1B is a graph illustrating DC drift in the reference signal for a traditional optical system of FIG. 1A.

With process, voltage, and/or temperature variations in the optical receiver (104-111), the LPF 110 cutoff frequency may drift away from its near DC level and become higher than the near DC cutoff level. For example, the cutoff frequency may become more than the Nyquist frequency. Such a high cutoff frequency of the LPF 110 may cause the DC drift in the reference signal level. FIG. 1B shows a waveform 120 with a drifting reference signal 122 generated by the optical receiver 100 of FIG. 1A. A drifting reference signal means that the reference signal 122 is no longer near the mid-level of the electrical signal 121, but drifts away from the mid-level. The drift may cause the amplifier 106 of FIG. 1A to output incorrect data because the reference signal may be too low or too high from the mid-level of the electrical signal.

Furthermore, since the data on the optical link 103 of FIG. 1A is encoded by the DC-balanced data, the data is decoded after the amplifiers 106-108 by a corresponding DC-balance decoder 109 for further signal processing downstream. The data coding (encoding and decoding with DC-balanced data) is performed by coding schemes such as 8b/10b and 64b/66b coding schemes. As mentioned above, these coding schemes are used in the feedback system (106→107→108→110→111→106) of the optical receiver to generate the near mid-level (of the electrical signal) reference signal and thus require logic which consumes area and power.

Additionally, traditional optical systems use AC-coupling capacitors such as 105 in FIG. 1A between the transmitter 101 and the receiver (104 111). These AC-coupling capacitors occupy large space and add to the cost of the optical system. Moreover, the AC-coupling capacitors contribute to the DC drift of the reference signal.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the invention relate to a method and apparatus for generating a reference signal level in an optical receiver and for cancelling amplifier input offset via open loop optical receiver architecture.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one ore more signals that may travel in either direction any may be implemented with any suitable type of signal scheme, e. g., differential pair, single-ended, etc.).

As discussed later in detail with reference to the figures, in one embodiment, a reference signal level in the optical receiver is maintained near a mid-level of the electrical signal by eliminating the feedback mechanism (110 and 111 of FIG. 1A) of the optical receiver after a training phase is complete, and by eliminating the DC-balanced encoder (102 of FIG. 1A) and decoder (109 of FIG. 1A) from the optical system altogether.

In one embodiment, the electrical signal In is a current signal and the mid-level of the electrical signal is the current level which is half way of a high current level and a low current level of the electrical signal. In one embodiment, the high current level is 300 μA and the low current level is 100 μA.

In another embodiment, the electrical signal is a voltage signal and the mid-level of the electrical signal is the voltage level which is half way of a high voltage level and a low voltage level. In one embodiment, the high voltage level is the voltage supply level while the low voltage level is the ground level. In other embodiments, the high voltage level is near the voltage supply level e.g., ⅔rd of the voltage supply level, while the low voltage level is near the ground level e.g., ⅓rd of the ground supply level.

In one embodiment, the AC-coupling capacitors (e.g., capacitor 105 in FIG. 1A) between the transmitter and the receiver of the optical system are eliminated, thus providing a DC-coupled optical link. Power dissipation of the optical system is also reduced by removing the DC-balanced encoder and decoder and by disabling the feedback mechanism during normal operation of the optical receiver. Furthermore, processor area and cost is reduced by removing the DC-balanced encoder and decoder and by removing the AC-coupling capacitors between the optical transmitter and the optical receiver.

Figure 2A:
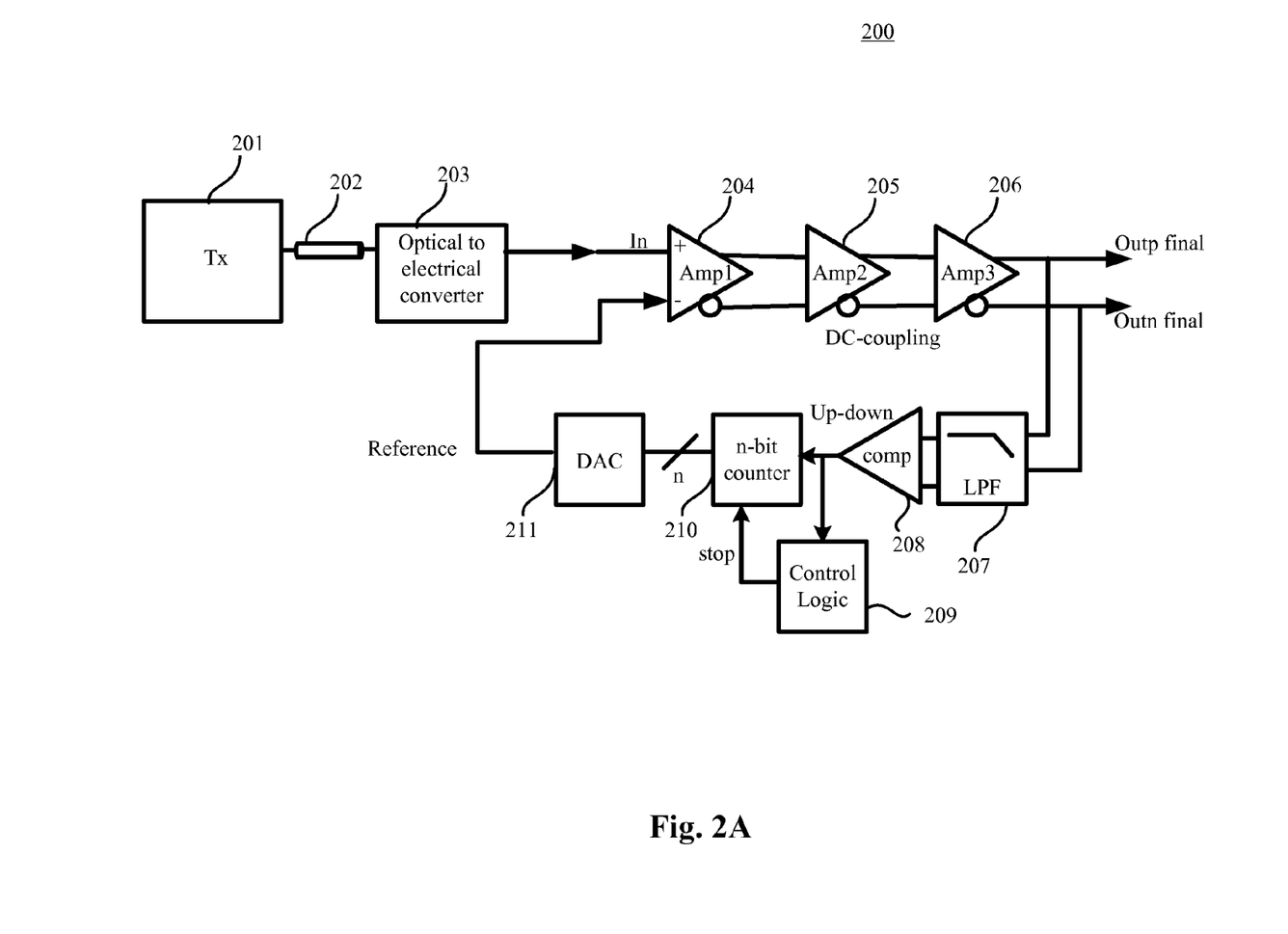
FIG. 2A illustrates an optical system with an optical receiver during a training phase, according to one embodiment of the invention.

FIG. 2A illustrates an optical system 200 during a training phase, according to one embodiment of the invention. In one embodiment, the training phase begins at a reset event such as power-up of the optical receiver and/or a system reset. In one embodiment, the training phase is triggered by hardware or software. In one embodiment, during the training phase, the reference signal level for a receiver amplifier 204 is set to a mid-level of an electrical signal In generated by the optical-to-electrical converter 203.

In one embodiment, the system comprises an optical transmitter 201 coupled with an optical receiver (203-211) via an optical link 202. In one embodiment, the optical link is a fiber optic cable. In other embodiments, other optical communication interconnects may be used to transmit an optical signal from the optical transmitter 201 to the optical receiver (203-211). The transmitter 201 transmits non-DC-balanced optical data via the optical link 202 to the optical-to-electrical converter 203 of the optical receiver (203-211).

Non-DC-balanced optical data means that the transmitter 201 does not encode the data for transmission with logical ones and logical zeros to generate a reference signal level near the mid-level of the electrical signal In at the input of the amplifier 204. Non-DC-balanced optical data also means that the receiver (203-211) does not need a decoder to decode data from the encoded DC-balanced optical data.

In one embodiment, the optical-to-electrical converter 203 converts an optical signal to an electrical signal In. In one embodiment, the electrical signal In is a current signal. In another embodiment, the electrical signal In is a voltage signal. In one embodiment, the optical-to-electrical converter 203 is a photo-detector having a photo diode. In one embodiment, the optical-to-electrical converter 203 couples with the amplifier 204.

In one embodiment, the amplifier 204 is a comparator to compare the electrical signal In with a reference signal. The output of the amplifier 204, in one embodiment, is amplified by one or more amplifiers 205-206 to generate a final output for further processing of the received data. In one embodiment, the amplifiers 204-206 are single ended amplifiers. In other embodiments, the amplifiers 204-206 are differential amplifiers to generate final differential outputs Outp final and Outn final. So as not to obscure the invention, the following embodiments discuss the operation of the optical system using differential amplifiers 204-206. A person skilled in the art can replace the differential amplifiers 204-206 with single-ended amplifiers without changing the essence of the embodiments of the invention.

In one embodiment, the outputs of the amplifier 206 Outp final and Outn final are input to a feedback mechanism comprising of a low pass filter (LPF) 207 and a comparator (or a gain stage) 208. In one embodiment, the LPF 207 and the gain stage 208 are configurable to be enabled only during the training phase. Once the training phase completes, the LPF 207 and the gain stage 208 are disabled by a logic (not shown) to reduce power consumption of the optical receiver, according to one embodiment of the invention. In one embodiment, the LPF 207 has a cutoff frequency which is near DC level. For example, the LPF 207 in one embodiment has a cutoff frequency from within the range of 100-500 KHz. In one embodiment, the LPF 207 is implemented with active (transistors) or passive (capacitor, resistor, inductor, etc.) devices or a combination of both. In one embodiment, the LPF 207 generates a near DC output from the output of the amplifier 206. In one embodiment, the output of the LPF 207 is amplified by the gain stage (or a comparator) 208 before it is input to a counter logic 209-211. In other embodiments, the output of the LPF 207 is directly input to the counter logic 209-211. In one embodiment, the gain stage 208 is an amplifier.

In one embodiment, the output of the gain stage 208 is an up-down signal which is input to a counter logic 209-211. In one embodiment, the counter logic comprises an N-bit counter 210 operable to count up or down based on the output of the gain stage 208. In one embodiment N is equal to 10. In one embodiment, if the up-down signal from the gain stage 208 is a logical one, then the N-bit counter 210 counts up. Conversely, in one embodiment, if the up-down signal is a logical zero, then the N-bit counter 210 counts down. The counter logic 209-211 also comprises a counter control logic 209 to stop the counter 210 when the reference signal level reaches a mid-level of the electrical signal.

In one embodiment, the counter control logic 209 stops the counter 210 from counting up or down once the up-down signal from the gain stage 208 (or in one embodiment, from the LPF 207) switches from logical one to a logical zero. In one embodiment, the counter control logic 209 monitors the up-down signal and counts the number of times the up-down signal switches between logical one and logical zero before triggering the stop signal. In one embodiment, the counter control logic 209 counts three times before triggering the stop signal. In other embodiments, the counter control logic 209 may count fewer than three or more than three times before triggering the stop signal. One purpose of counting by the counter control logic 209 before triggering the stop signal is to filter any noise on the up-down signal that may cause a false stop of the counter 210. In one embodiment, the counter control logic 209 stops the counter 210 from counting when the training phase completes.

In one embodiment, the output of the counter 210 is converted to the reference signal via a digital-to-analog converter 211. In one embodiment, the digital-to-analog converter (DAC) 211 includes a voltage divider having multiple voltage taps that are selectable from a multiplexer. In one embodiment, the output of the DAC 211 is a voltage signal which is input to the amplifier 204. In another embodiment, the output of the DAC 211 is a current signal which is input to the amplifier 204. The amplifier 204, in one embodiment, is operable to receive In and the reference signals as voltages. In other embodiments, the amplifier 204 is a current amplifier operable to receive In and the reference signal as current signals.

In one embodiment, once the counter control logic 209 stops the counter 210 from counting, the feedback mechanism (the LPF 207 and the gain stage 208) is disabled. As mentioned above, the counter control logic 209 may stop the counter 210 once the up-down signal changes from logical one to a logical zero (or visa versa) or when a training phase is complete. Once the counter is stopped from counting, the value of the counter is maintained so that the reference signal remains at mid-level of the electrical signal In. At that point, the receiver is configured to operate as an open loop receiver.

Figure 2B:
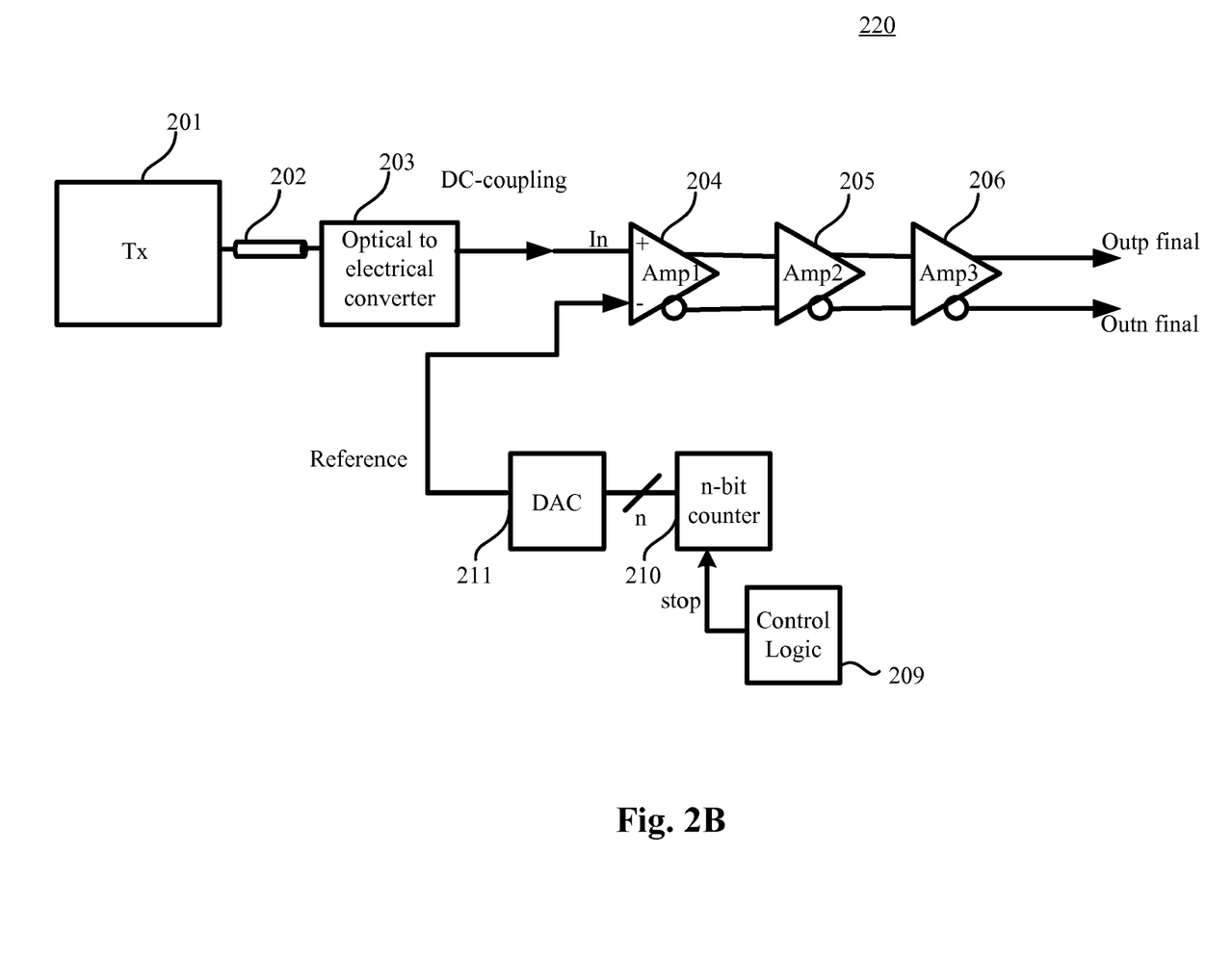
FIG. 2B illustrates an open loop optical system after the training phase is completed, according to one embodiment of the invention.

FIG. 2B illustrates an open loop optical system after the counter 210 stops counting, according to one embodiment of the invention. In such an embodiment, the feedback mechanism (the LPF 207 and the gain stage 208) is no longer operational to generate the up-down signal and so the reference signal is not generated by the up-down signal, thus making the receiver an open loop receiver.

Unlike the closed loop receiver (106→107→108→110→111) of FIG. 1A, the open loop receiver of FIG. 2B consumes less power because the feedback mechanism (the LPF 207 and the gain stage 208) is disabled and is not consuming power. Furthermore, the reference signal remains at mid-level of the electrical signal In because the counter 210 is stopped from counting i.e., the output of the counter 210 and thus the DAC 211 remain stable, and because the LPF 207 does not interfere with the maintenance/holding of the reference signal level. As a result, the reference signal level no longer drifts away from the mid-level of the electrical signal In.

The embodiments of FIG. 2A and FIG. 2B also do not require the transmitter 201 to DC-balance the optical data for transmission, and also do not require the optical receiver to decode the received data from the encoded DC-balanced data. By eliminating such encoders and decoders from the optical system, power consumption and processor area is reduced.

One reason for removing the DC-balancing encoders and decoders is that the counter 210, counter control logic 209, and the DAC 211 generate a mid-level reference signal from the electrical signal In without continuously relying on how many logical ones and logical zeros form the electrical signal In. While the number of logical ones and logical zeros in the electrical signal In initially generate the up-down signal used for generating the reference signal, the reference signal is set to mid-level and held at that level once the mid-level is achieved i.e., when the stop signal triggers and/or when the training phase completes. Thereafter, the logical ones and the logical zeros in the electrical signal In do not change the reference signal mid-level. Because the reference signal no longer relies on equal number of logical ones and logical zeros on the electrical signal to hold the generated reference signal at mid-level, the role of the DC-balancing encoder (and thus the DC-balancing decoder) is eliminated.

In one embodiment, AC-coupling capacitors such as the AC-coupling capacitor 105 of FIG. 1A are not required because the reference signal level generated by the embodiments of FIG. 2A and FIG. 2B becomes independent of the signal level of the transmitted signal from the transmitter 201 once the mid-level of the reference signal is generated and held at that level. By eliminating the AC-coupling capacitors (such as capacitor 105 of FIG. 1A) for the embodiments of FIG. 2A and FIG. 2B, processor area and cost is reduced.

Figure 3:
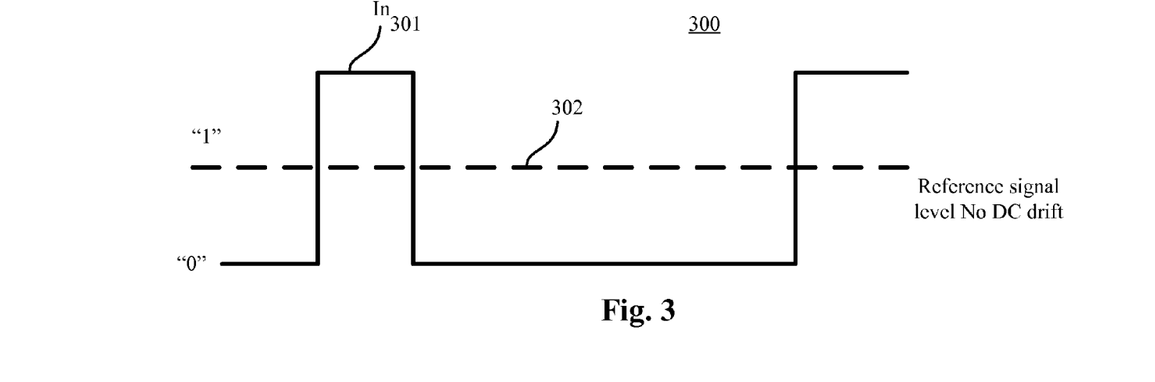
FIG. 3 is a graph illustrating the reference signal generated by the optical receiver, according to one embodiment of the invention.

FIG. 3 illustrates a graph 300 of the reference signal generated by the optical receiver of FIG. 2A and FIG. 2B, according to one embodiment of the invention. In one embodiment, the electrical signal In 301 generated by the optical-to-electrical converter 203 of FIG. 2A and FIG. 2B is detected by the amplifier 204 relative to the reference signal 302. The electrical signal In 301 which is either a voltage signal or a current signal has a high level and a low level indicated by "1" and "0" in FIG. 3. The reference signal 302 is generated to be halfway of the high level and the low level of the electrical signal In 301. As described with reference to embodiments of FIG. 2A and FIG. 2B, by setting the reference signal 302 to a mid-level relative to the high and the low levels of the electrical signal In 301, AC-coupling capacitors can be eliminated, DC-balancing encoders and decoders are eliminated, and the optical receiver becomes an open loop receiver with the feedback mechanism (LPF 207 and gain stage 208) disabled. Consequently, a stable reference signal is generated which is immune from drifting.

Figure 4:
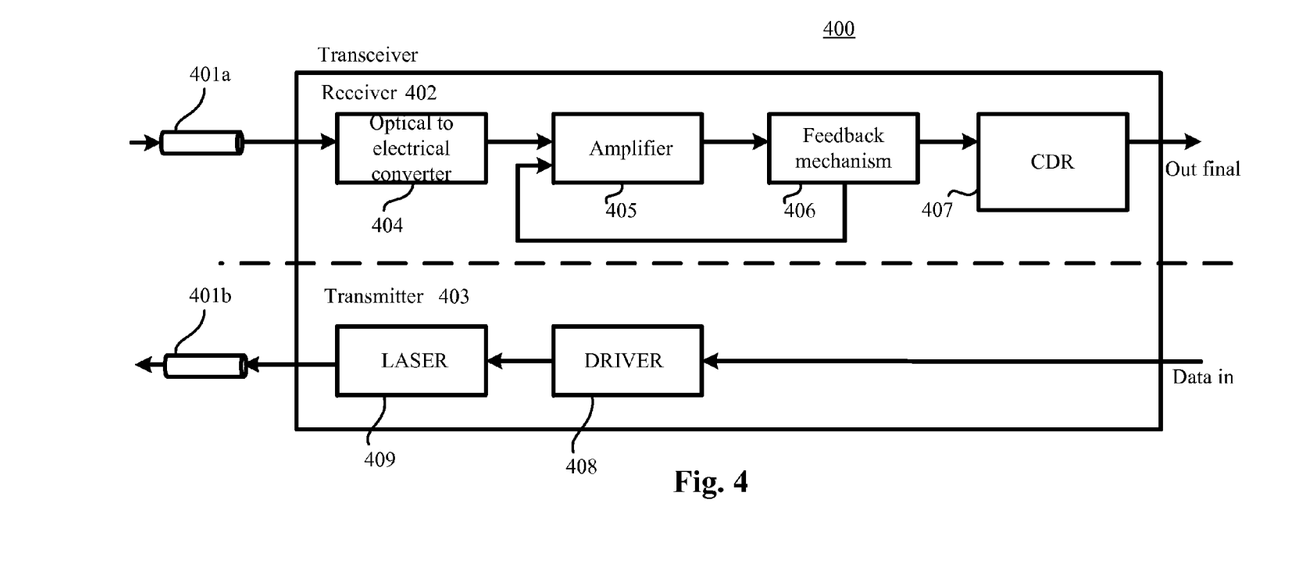
FIG. 4 illustrates a high level block diagram of an optical transceiver, according to one embodiment of the invention.

FIG. 4 illustrates a high level system block diagram of an optical transceiver 400, according to one embodiment of the invention. In one embodiment, the optical transceiver 400 comprises an optical receiver 402 coupled with an optical link 401a and an optical transmitter 403 coupled with an optical link 401b. In one embodiment, the optical links 401a and 401b are fiber optic interconnects. In other embodiments, other forms of optic interconnects may be used. In one embodiment, both the receiver 402 and the transmitter 403 are coupled with the same optical link (not shown).

In one embodiment, the optical receiver 402 comprises an optical-to-electrical converter 404 coupled with an amplifying stage 405. The output of the amplifying stage 405 inputs to a feedback mechanism 406 which includes the LPF 207 and the gain stage 208 of FIG. 2A. As mentioned in reference to FIG. 2A and FIG. 2B, the feedback mechanism 406 is disabled after the training phase and/or when the counter control logic 209 of FIG. 2A and FIG. 2B triggers the stop signal. In one embodiment, when the feedback mechanism 406 is disabled, the output of the amplifying stage 405 is used to process the data received by the optical-to-electrical converter 404. In one embodiment, a clock-data-recovery (CDR) unit 407 follows the amplifying stage 405. The CDR 407 is not discussed so as not to obscure the embodiments of the invention. In the above described embodiments, no DC-balancing decoder (as shown as 109 in FIG. 1A) is used in the optical receiver 402 of FIG. 4 because the DC-balancing encoder (as shown as 102 in FIG. 1A) in the transmitter 403 is removed.

Referring back to FIG. 4, in one embodiment, the optical transmitter 403 comprises a laser 409 and a driver 408. The driver 408 receives data for transmission data_in which is non-DC-balanced data and amplifies it for the laser 409. The laser 409 converts the electrical form of amplified data data_in to optical data and sends the optical data to the optical interconnect 401*b*. In the above described embodiment, no DC-balancing encoder (as shown as 102 in FIG. 1A) is used in the optical transmitter 403.

Figure 5A:
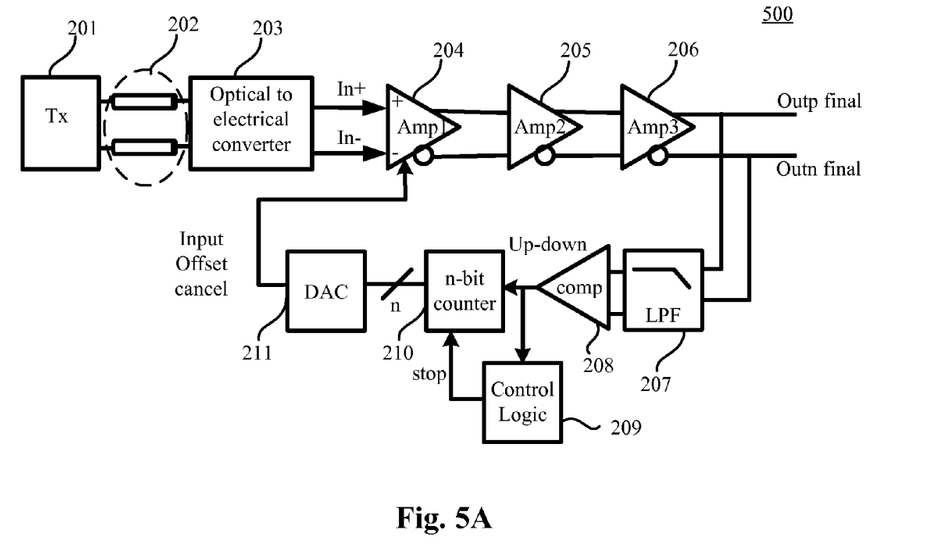
FIG. 5A illustrates an apparatus for cancelling amplifier input offset during the training phase, according to one embodiment of the invention.
Figure 5B:
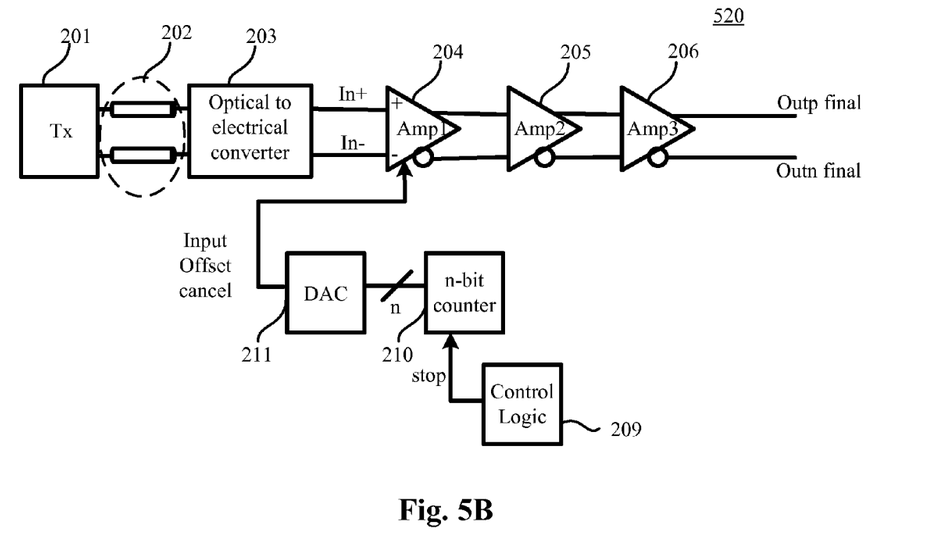
FIG. 5B illustrates an apparatus for cancelling amplifier input offset after completing the training phase, according to one embodiment of the invention.

FIGS. 5A-B illustrate how the embodiments of FIGS. 2A-B are used to cancel amplifier input offset, according to one embodiment of the invention. Input offset is an artifact experienced by amplifiers due physical device size mismatches and due to process, temperature, and voltage variations in the devices comprising the amplifier. Input offset may be defined as the difference between the output signals Outp final and Outn final of FIG. 5A when the input signals In+ and In− are set equal to one another. Adjusting the device strength of the amplifier devices so that the difference between the output signals Outp final and Outn final is zero results in cancelling the input amplifier offset.

Referring to FIG. 5A, an apparatus 500 is illustrated for cancelling input offset of the amplifier 204 during the training phase, according to one embodiment of the invention. In one embodiment, the output of the DAC 211 functions as an input offset cancel signal which causes a difference between the output signals Outp final and Outn final to be zero when the input signals In+ and In− are equal to one another. Hence, with reference to FIGS. 5A-B, the term reference signal of FIGS. 2A-B also refers to the term input offset cancel signal because the reference signal causes the optical receiver to achieve a reference stage—a stage when the reference signal (as used in FIGS. 2A-B) is trained to be at mid-level of the electrical signal In and when the reference signal (as used for cancelling input offset of the amplifier 204) is trained to cancel the input amplifier offset.

Referring to FIG. 5A, in one embodiment, during the training phase the differential output signals Outp final and Outn final are used by the LPF 207 and the gain stage 208 to generate an up-down signal. In this embodiment, the control logic 209 triggers a stop signal when the training phase completes or when the up-down signal changes from a logical one to a logical zero (or visa versa). In one embodiment, when the control logic 209 triggers the stop signal, the counter 210 is stopped and the input offset cancel signal is stabilized. In one embodiment, the input offset cancel signal is an analog signal which is either an electrical signal or a voltage signal. In one embodiment, the input offset cancel signal is generated by the DAC 211 which is discussed above with reference to FIG. 2A. In one embodiment, the input offset cancel signal adjusts the currents of the input devices (not shown) of the amplifier 204 so that the difference between the output signals Outp final and Outn final is zero when the inputs In+ and In− are equal to one another.

FIG. 5B illustrates an apparatus 520 for cancelling amplifier input offset after completing the training phase, according to one embodiment of the invention. As mentioned with reference to FIG. 2B, when the training phase completes, the feedback mechanism (the LPF 207 and the gain stage 208) is disabled. At that point, the counter 210 is stopped from counting and the input offset cancel signal is maintained to its last updated level. The maintained input offset cancel signal ensures that the optical receiver has zero input offset after completing the training phase. A zero input offset of the amplifier 204 allows for error free detection of the electrical signal In in FIG. 2A.

Figure 6:
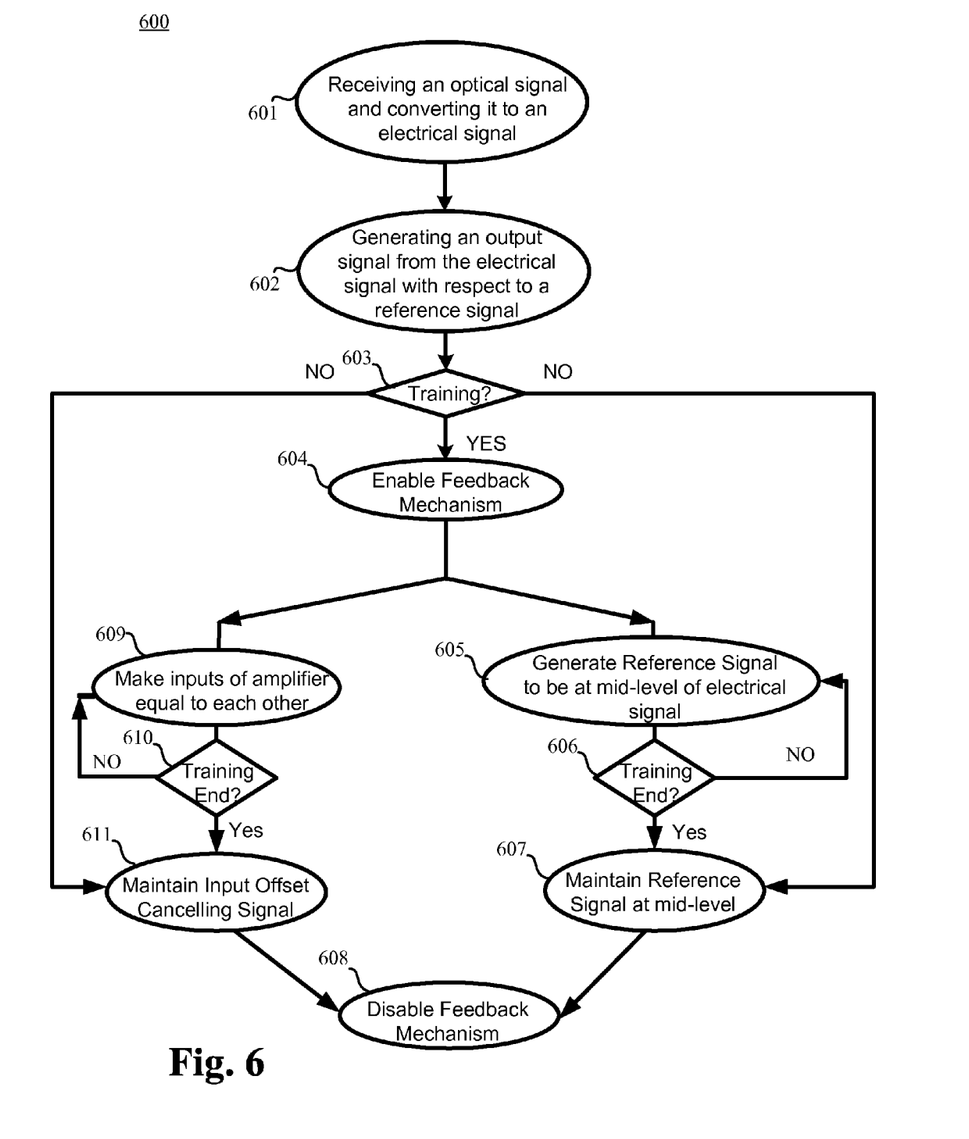
FIG. 6 is a flowchart illustrating a method for achieving a mid-level reference signal without DC-balancing, and a method for cancelling input amplifier offset, according to one embodiment of the invention.

FIG. 6 is a flowchart 600 illustrating the method for achieving a mid-level reference signal without DC-balancing, and a method for cancelling input amplifier offset, according to one embodiment of the invention. The method is discussed with reference to FIGS. 2A-B and FIGS. 5A-B.

At block 601, the optical-to-electrical converter (such as the converter 203 of FIG. 2A and FIG. 2B) receives a non-DC-balanced optical signal and converts it to an electrical signal In. As mentioned above, the electrical signal In may be a current signal or a voltage signal.

At block 602, an output signal is generated from the electrical signal with respect to a reference signal. With reference to FIG. 2A, in one embodiment, the output signals Outp final and Outn final are output of the amplifier 206. Referring back to FIG. 6, at block 603, the optical system determines if the optical receiver is in a training phase. If the optical receiver is in the training phase then at block 604 the feedback mechanism (the LPF 207 and the gain stage 208 of FIG. 2A) is enabled. If the optical receiver is not in the training phase then at block 611 the input offset cancel signal of FIGS. 5A-B is maintained at its last value resulting in zero input offset, and at block 607 the reference signal of FIGS. 2A-B is maintained at its last value which is the mid-level of the electrical signal In. At block 608, the feedback mechanism (the LPF 207 and the gain stage 208 of FIG. 2A) is disabled resulting in an open loop optical receiver architecture.

As mentioned above, at block 604 of FIG. 6, the feedback mechanism (the LPF 207 and the gain stage 208 of FIG. 2A) is enabled. The two branches that stem out after block 604 represent the method for cancelling input offset of the amplifier 204 and the method for generating a mid-level reference signal for the amplifier 204.

With reference to the right hand side branch, at block 605, the feedback mechanism generates an up-down signal (or control signal) that increments or decrements a count value of the counter 210 of FIG. 2A. This count value is stopped when a determination is made at block 606 whether the training phase has ended and/or the counter control logic 209 of FIG. 2A has triggered a stop signal. If the training phase is complete and/or the counter control logic 209 of FIG. 2A has triggered a stop signal, a mid level reference signal is generated. If the training phase is incomplete and/or the counter control logic 209 of FIG. 2A has not triggered the stop signal, then the loop continues at block 605. At block 607, the reference signal is maintained at mid-level of the electrical signal In. At block 608, the feedback mechanism is disabled.

With reference to the left hand side branch, at block 609, the inputs of the amplifier In+ and In− (see FIGS. 5A-B) are made equal to one another and the feedback mechanism (the LPF 207 and the gain stage 208 of FIG. 5A) generates an up-down signal (or control signal) that increments or decrements a count value of the counter 210 of FIG. 5A. This count value is stopped when a determination is made at block 610 whether the training phase has ended and/or the counter control logic 209 of FIG. 5A has triggered a stop signal. If the training phase is complete and/or the counter control logic 209 of FIG. 5A has triggered the stop signal, the input amplifier offset is cancelled. As discussed above, the input amplifier offset is cancelled when the difference between the output signals Outp final and Outn final of FIG. 5A is zero when the inputs In+ and In− are equal. If the training phase is incomplete and/or the counter control logic 209 of FIG. 5A has not triggered the stop signal, then the loop continues at block 609. At block 611, the input offset cancel signal is maintained as shown by FIG. 5B at its last updated value. At block 608, the feedback mechanism is disabled as shown in FIG. 5B.

Elements of embodiments are also provided as a machine-readable storage medium for storing the computer-executable instructions. For example, the method of generating a mid-level reference signal and the method of cancelling input offset of the amplifier 204 as discussed in FIG. 6 is programmable via computer-executable instructions. The machine-readable storage medium may include, but is not limited to, flash memory, optical disks, CD-ROMs, DVD ROMs, RAMs, EPROMs, EEPROMs, magnetic or optical cards, or other type of machine-readable storage media suitable for storing electronic or computer-executable instructions. For example, embodiments of the invention may be downloaded as a computer program which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While the invention has been described in conjunction with specific embodiments thereof, many alternatives, modifications and variations will be apparent to those of ordinary skill in the art in light of the foregoing description.

For example, the input offset cancel signal may also change device strength by enabling more input devices of the amplifier 204 to be turned on or off so that the difference between the output signals Outp final and Outn final is zero when the inputs In+ and In− are equal. In one embodiment, the same input offset cancel signal that is used for cancelling input offset of amplifier 204 is also be used to cancel the offset of the other amplifiers 205 and 206 if the amplifiers 205 and 206 are identical in design and size to amplifier 204.

The embodiments of the invention are intended to embrace all such alternatives, modifications, and variations as to fall within the broad scope of the appended claims.

We claim:

1. An apparatus comprising:
   an optical-to-electrical converter to receive an optical signal and to generate an electrical signal;
   an amplifier to receive the electrical signal and to generate an output signal based on a reference signal;
   a feedback mechanism to be enabled during a training phase and to generate a control signal according to the output signal, wherein the feedback mechanism is operable to be disabled after the training phase is complete, and wherein the control signal is an up-down signal generated from the output signal;
   a logic to disable the feedback mechanism after completing the training phase; and
   a counter logic having a digital-to-analog converter to generate the reference signal based on the control signal, wherein the counter logic to stop counting up or down based on the control signal, wherein the counter logic to generate a count signal for the digital-to-analog converter for generating the reference signal, and
   wherein an optical transmitter to transmit the optical signal on a DC-coupled optical link, wherein the optical signal is a non-DC-balanced signal.

2. The apparatus of claim 1, wherein the counter logic to generate the reference signal to be at half a level of a high level and a low level of the electrical signal.

3. The apparatus of claim 1, wherein the counter logic to generate the reference signal be to of a level to cancel input offset of the amplifier.

4. The apparatus of claim 1, wherein the optical-to-electrical converter includes a photo detector.

5. The apparatus of claim 1, wherein the feedback mechanism comprises:
   a low pass filter, coupled with the amplifier, having a cutoff frequency which is near a DC level and to filter the output signal from the amplifier; and
   a comparator, coupled with the low pass filter, to generate the control signal based on the filtered output signal.

6. The apparatus of claim 1, wherein the counter logic to stop counting up or down based on the control signal.

7. A method comprising:
   receiving, via an optical-to-electrical converter, an optical signal;
   converting the optical signal to an electrical signal;
   generating an output signal from the electrical signal, the generating based on a reference signal;
   generating a control signal, by a feedback mechanism, according to the output signal during a training phase, wherein the feedback mechanism is operable to be disabled after the training phase is complete, and wherein generating the control signal comprises:
      enabling a low pass filter to filter the output signal;
      generating an up-down signal from the filtered output signal to increment or decrement a counter; and
      stopping the counter when a counter count signal reaches a value which causes the reference signal to be at half the level of a high level and a low level of the electrical signal; and
   generating the reference signal based on the control signal.

8. The method of claim 7, wherein the optical signal is a non-DC-balanced signal.

9. The method of claim 7, further comprising disabling the low pass filter after the training phase completes, wherein the training phase is a power-up phase.

10. The method of claim 7, wherein generating the reference signal based on the control signal comprises converting the counter count signal to the reference signal via a digital-to-analog converter.

11. The method of claim 7, further comprising setting the reference signal to be at half a level of a high level and a low level of the electrical signal.

12. The method of claim 7, further comprising setting the reference signal to a level to cancel input offset of an amplifier.

13. A system comprising:
   an optical link; and
   a transceiver coupled with the optical link and to receive a first optical signal from the optical link and to transmit a second optical signal on the optical link, the transceiver having:
      an optical receiver comprising:
         an optical-to-electrical converter to receive the first optical signal and to generate an electrical signal;
         an amplifier to receive the electrical signal and to generate an output signal based on a reference signal;
         a feedback mechanism to be enabled during a training phase and to generate a control signal according to the output signal, wherein the feedback mechanism is operable to be disabled after the training phase is complete, wherein the control signal is an up-down signal generated from the output signal;
         a logic to disable the feedback mechanism after completing the training phase; and a counter logic having a digital-to-analog converter to generate the reference signal based on the control signal, wherein the counter logic to stop counting up or down based on the control signal, and wherein the counter logic to generate a count signal for the digital-to-analog converter for generating the reference signal; and an optical transmitter to transmit the second optical signal on the DC-coupled optical link, wherein the second optical signal is a non-DC-balanced signal.

14. The system of claim 13, wherein the first optical signal is a non-DC-balanced signal, wherein the counter logic to generate the reference signal be to of a level to cancel input offset of the amplifier.

15. The system of claim 13, wherein the counter logic to generate the reference signal to be at half a level of a high level and a low level of the electrical signal.

16. The system of claim 13, wherein the feedback mechanism of the optical receiver comprises:

a low pass filter, coupled with the amplifier, having a cutoff frequency which is near DC level and to filter the output signal from the amplifier; and a comparator, coupled with the low pass filter, to generate the control signal based on the filtered output signal.

* * * * *

UNITED STATES PATENT AND TRADEMARK OFFICE
CERTIFICATE OF CORRECTION

| | | |
|---|---|---|
| PATENT NO. | : 8,331,804 B2 | Page 1 of 1 |
| APPLICATION NO. | : 12/722839 | |
| DATED | : December 11, 2012 | |
| INVENTOR(S) | : Gao et al. | |

It is certified that error appears in the above-identified patent and that said Letters Patent is hereby corrected as shown below:

In the Specification

Column 3, line 5 delete, "ore" and insert --or--.

In the Claims

Column 9, line 59, claim 1 delete, "signal, wherein" and insert --signal, and wherein--.

Column 9, line 61, claim 1 delete, "signal, and" and insert --signal,--.

Signed and Sealed this
Ninth Day of September, 2014

Michelle K. Lee
*Deputy Director of the United States Patent and Trademark Office*